United States Patent
Okita et al.

(10) Patent No.: US 9,008,821 B2
(45) Date of Patent: Apr. 14, 2015

(54) SERVO CONTROL SYSTEM CAPABLE OF IMPROVING PROCESSING ACCURACY

(75) Inventors: Tadashi Okita, Minamitsuru-gun (JP); Yukio Toyozawa, Minamitsuru-gun (JP); Kazuomi Maeda, Minamitsuru-gun (JP); Naoto Sonoda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 904 days.

(21) Appl. No.: 13/215,612

(22) Filed: Aug. 23, 2011

(65) Prior Publication Data

US 2012/0059506 A1 Mar. 8, 2012

(30) Foreign Application Priority Data

Sep. 6, 2010 (JP) ................................. 2010-198856

(51) Int. Cl.
*G06F 19/00* (2011.01)
*G05B 13/02* (2006.01)

(52) U.S. Cl.
CPC ................................. *G05B 13/0265* (2013.01)

(58) Field of Classification Search
CPC ..................... G05B 19/4163; G05B 19/40937; G05B 19/41865
USPC .................................................. 700/173, 49
See application file for complete search history.

(56) References Cited

U.S. PATENT DOCUMENTS

| 6,317,646 B1 * | 11/2001 | de Caussin et al. ........... 700/173 |
| 6,566,836 B2 * | 5/2003 | Matsubara et al. ........... 318/600 |
| 6,859,007 B2 | 2/2005 | Toyozawa et al. |
| 7,215,089 B2 | 5/2007 | Toyozawa et al. |
| 2006/0255759 A1 | 11/2006 | Takeuchi et al. |

FOREIGN PATENT DOCUMENTS

| JP | 62-221004 | 9/1987 |
| JP | 3-175502 | 7/1991 |
| JP | 2004-280772 | 10/2004 |
| JP | 2005-216135 | 8/2005 |
| JP | 2007-334570 | 12/2007 |

* cited by examiner

*Primary Examiner* — Carlos Ortiz Rodriguez
(74) *Attorney, Agent, or Firm* — Drinker Biddle & Reath LLP

(57) ABSTRACT

A servo control system capable of using an angle-based synchronization learning control, even when a reference position is not given, while maintaining the advantage of the angle-based synchronization method. The servo control system has X-, y- and z-axes servo controllers, each configured to control x-, y- and z-axes servomotors, respectively. Each of x- and y-axes servo controllers has a reference signal generating part configured to generate a reference signal which monotonically increases or varies in one direction, based on the position command of each axis transmitted from a higher-level controller.

6 Claims, 12 Drawing Sheets

$X = R \cdot \cos(wt)$ $Y = R \cdot \sin(wt)$

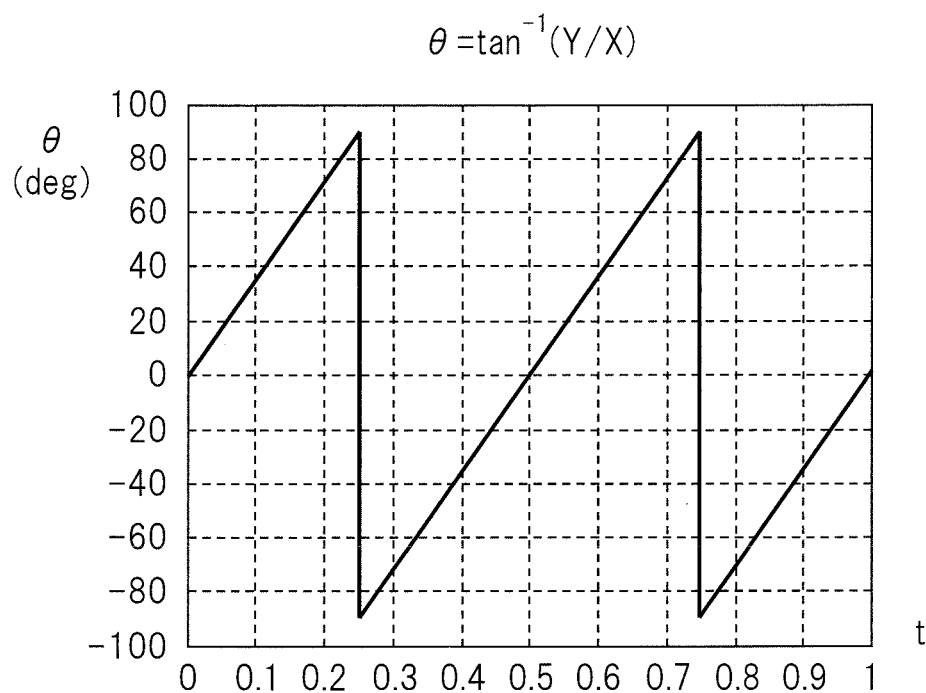
Fig.6a
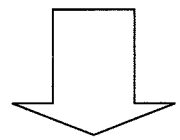
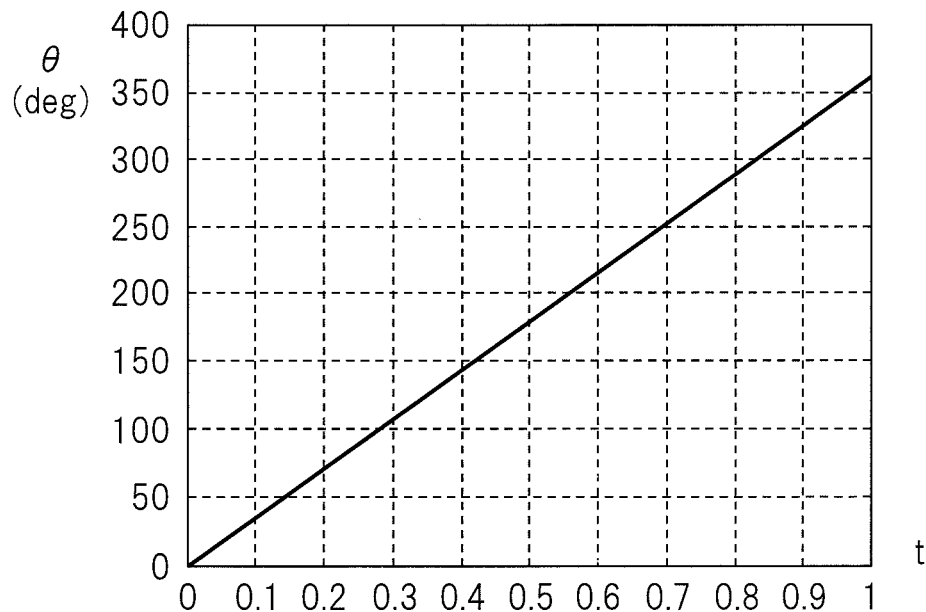
Fig.6b $\theta = \Sigma |\Delta X| + \Sigma |\Delta Y|$ Fig.12
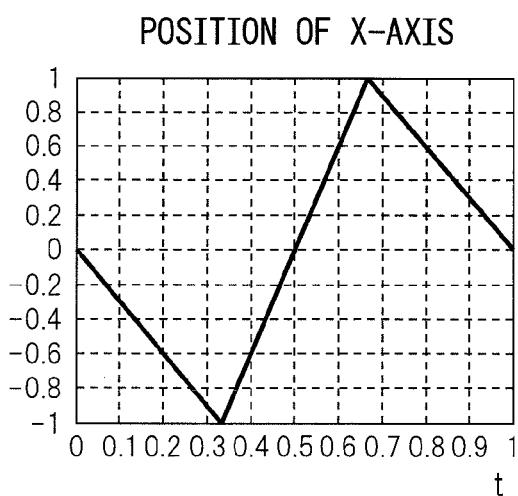
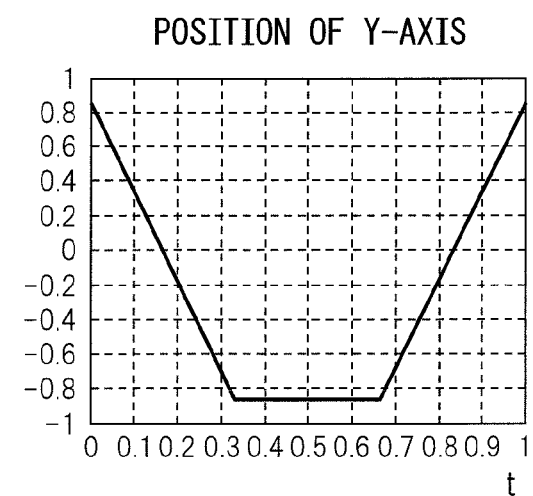
Fig.13
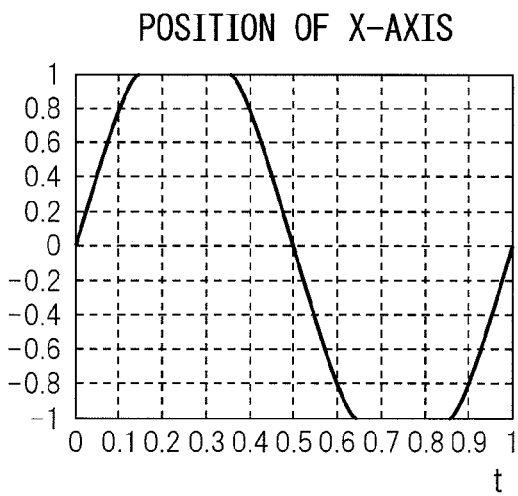
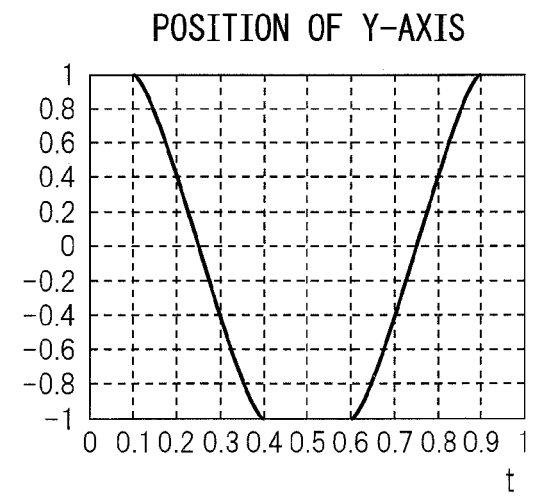

$\theta = \Sigma |\Delta X| + \Sigma |\Delta Y|$ $\theta = \Sigma |\Delta X| + \Sigma |\Delta Y|$

SERVO CONTROL SYSTEM CAPABLE OF IMPROVING PROCESSING ACCURACY

RELATED APPLICATIONS

The present application claims priority from Japanese Patent Application No. 2010-198856, filed on Sep. 6, 2010, the entire contents of which are fully incorporated herein by reference.

BACKGROUND OF THE INVENTION

1. Field of the Invention

The present invention relates to a servo control system having a function for improving a processing accuracy in a machine tool wherein a plurality of axes are cooperatively actuated.

2. Description of the Related Art

When a plurality of axes are cooperatively actuated in a machine tool, such as a machining center, in particular when a circular shape is processed by using X- and Y-axes, high machining accuracy is desired. In a conventional control system, it is difficult to improve the accuracy of the boundary between quadrants of an arc, due to delay of the servo, in particular when the servo is inversed.

On the other hand, as a method for realizing high speed and high accuracy, in response to repeating commands, a learning control (or a repeat control) may be used, which includes a time-based synchronization method wherein the learning is carried out by using time as a reference (e.g., see Japanese Unexamined Patent Publication (Kokai) No. 3-175502) and an angle-based synchronization method wherein the learning is carried out by using an angle as a reference. For example, Japanese Unexamined Patent Publication (Kokai) No. 2004-280772 discloses learning control, wherein correction data corresponding to the position of the shape in repeat patterns is stored and the positional deviation is corrected corresponding to the position, by which the positional deviation can be reduced even when velocity fluctuation occurs.

Since the time-based synchronization method requires a memory delay for time from start to end of the processing, a high-capacity memory is necessary when processing time is relatively long. Further, when the same shape is processed at different processing speed, another memory delay is necessary. On the other hand, in the angle-based synchronization method, there is no disadvantage when the processing time is long or when the processing speed is varied, however, a reference angle (or a reference position), which monotonically increases (or increases in one direction) in synchronization with repeated commands, is necessary. Therefore, the reference position is varied like a reciprocating motion, the angle-based synchronization method cannot be used.

In the description regarding FIG. 3 of Japanese Unexamined Patent Publication (Kokai) No. 2004-280772, correction data δ(n) corresponding to reference position Θ(n) is calculated by interpolating calculation as shown in the following equation, wherein reference position Θ(n) is obtained at the time of sampling, and correction data, before and after reference position Θ(n), are δ(m) and δ(m+1) which correspond to grid positions θ(m) and θ(m+1), respectively.

$$\delta(n)=\delta(m)+(\Theta(n)-\theta(m))\cdot(\delta(m+1)-\delta(m))/\theta(m+1)-\theta(m))$$

When reference position Θ does not monotonically increase or decrease, a plurality of data δ may exist corresponding to each reference position, whereby the correction data cannot be accurately determined.

SUMMARY OF THE INVENTION

An object of the present invention is to provide a servo control system, capable of using angle-based synchronization learning control, even when the reference position is not given, while maintaining the advantage of the angle-based synchronization method.

According to one aspect of the present invention, there is provided a servo control system of an industrial machine or a machine tool for processing a shape comprising by an arc, a polygon or a combination thereof, by means of cooperative operation of a plurality of axes including two mutually orthogonal axes, the servo control system comprising: a higher-level controller configured to transmit position commands for processing the processed shape to a servomotor of each of the plurality of axes; and a plurality of servo controllers, each configured to drive the servomotor of each axis based on the position command so as to move a driven body, the servo controllers for at least the two mutually orthogonal axes comprising: a position detecting part configured to detect the position of the servomotor or the driven body; a positional deviation calculating part configured to calculate a deviation between the position command and a detected position feedback of the servomotor, at every predetermined sampling period of time; a reference signal generating part configured to generate a reference signal which is varied in one direction, based on the position command or the position feedback of the own axis or another axis; and a learning controlling part configured to carry out learning control based on the reference signal, the position command and the positional deviation.

In a preferred embodiment, the reference signal generating part generates an angular position as the reference signal, based on the position command or the position feedback of x- and y-axes, the origin of which is the center of an arc, the angular position being calculated by an arctangent function of a ratio between positions of the x- and y-axes.

In another preferred embodiment, the reference signal generating part generates the reference signal, based on the position command or the position feedback of the cooperative other axis, by integrating each absolute value of an amount of movement of the other axis at every predetermined sampling period of time.

When the processed shape is an interpolation shape between x- and y-axes, the reference signal generating part may generate the reference signal, the reference signal being obtained by calculating a summation of an integrated value of each absolute value of an amount of movement of the position command or the position feedback of x-axis at every predetermined sampling period of time, and an integrated value of each absolute value of an amount of movement of the position command or the position feedback of y-axis at every predetermined sampling period of time.

When the processed shape is a helical interpolation shape, the reference signal generating part may generate the reference signal, the reference signal corresponding to the position command or the position feedback of a helical axis.

BRIEF DESCRIPTION OF THE DRAWINGS

The above and other objects, features and advantages of the present invention will be made more apparent by the following description of the preferred embodiments thereof with reference to the accompanying drawings wherein:

FIGS. 6a and 6b show a first generating method of a reference signal when the arc shape is processed;

FIG. 12 shows graphs showing angular positions of x- and y-axes when the processed shape is the triangle;

FIG. 13 shows graphs showing angular positions of x- and y-axes when the processed shape is the quadrangle with rounded corners;

DETAILED DESCRIPTION

Figure 1:
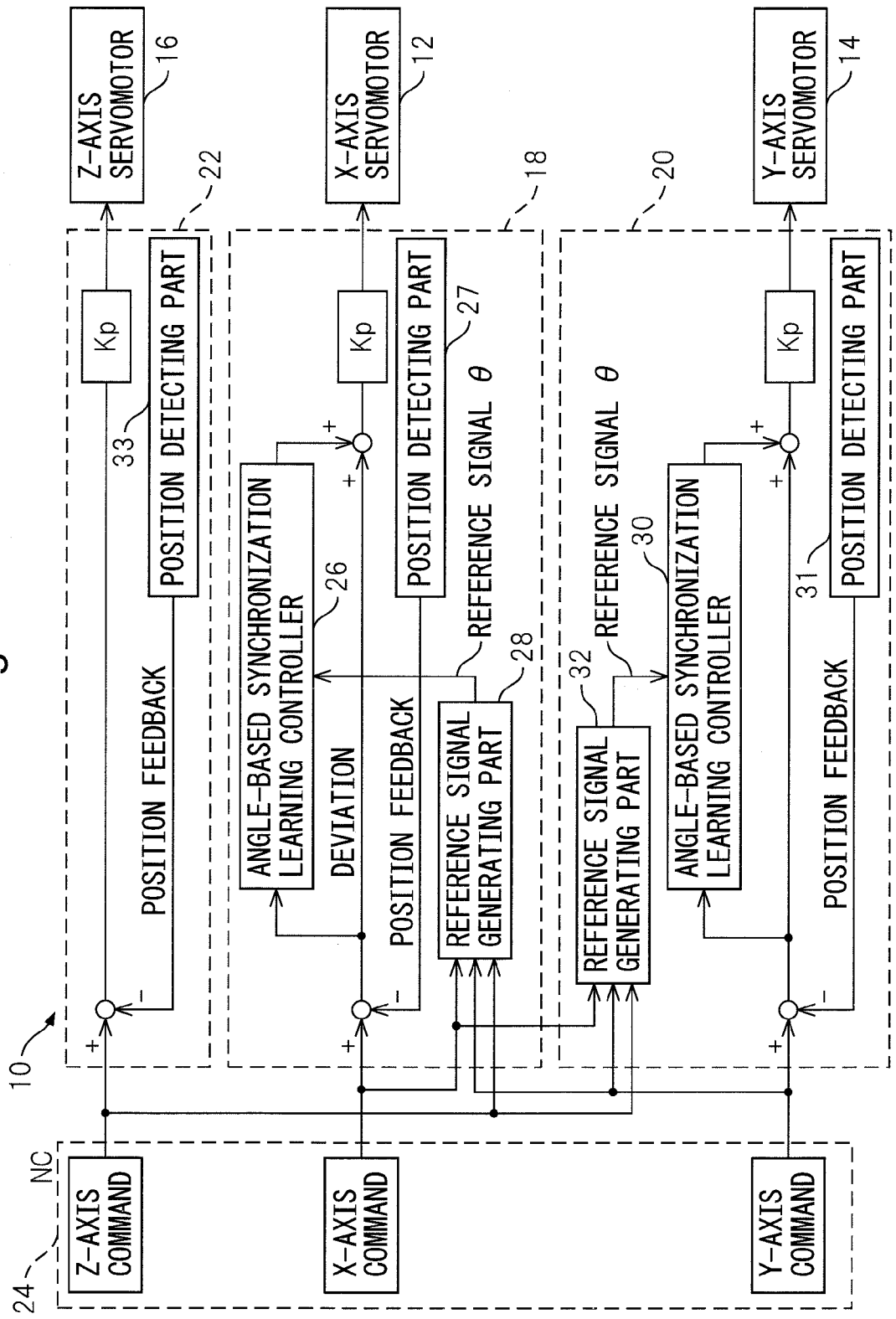
FIG. 1 shows a basic configuration of a servo control system according to the present invention.

FIG. 1 shows a basic configuration of a servo control system according to the present invention. Servo control system 10 is used in a machine tool or an industrial machine such as a machining center including at least two mutually orthogonal axes (x-, y- and z-axes in an illustrated embodiment) which carry out a cooperative motion. Servo control system 10 includes an x-axis servo controller 18 configured to control an x-axis servomotor 12 for driving an x-axis, a y-axis servo controller 20 configured to control a y-axis servomotor 14 for driving a y-axis, and a z-axis servo controller 22 configured to control a z-axis servomotor 16 for driving a z-axis. Each servo controller is configured to generate a speed command based on a position command for each axis (x-axis command, y-axis command and z-axis command in the illustrated embodiment) transmitted from a higher-level controller 24 such as an NC (Numerical Controller), and control each servomotor based on the speed command.

X-axis servo controller 18 has an angle-based synchronization learning controlling part (or a learning controller) 26. In order to carry out a predetermined processing, learning controller 26 is configured to generate an amount of correction for controlling x-axis servomotor 12 based on a deviation between the position command for the x-axis periodically transmitted from higher-level controller 24 and the position feedback (FB) of x-axis servomotor 12 or a driven body, such as a tool, driven by x-axis servomotor 12. The amount of correction and deviation are used as an x-axis servo speed command, via a gain Kp, so as to control x-axis servomotor 12. The position feedback is obtained by a position detecting part 27 configured to detect the x-position of x-axis servomotor 12 or the driven body. X-axis servo controller 18 has a reference signal generating part 28 configured to generate a reference signal θ which monotonically increases (or varies in one direction) based on the axis command transmitted from higher-level controller 24. Then, learning controller 26 carries out learning control based on the reference signal which is explained below.

Similarly, y-axis servo controller 20 has an angle-based synchronization learning controlling part (or a learning controller) 30. In order to carry out a predetermined processing, learning controller 30 is configured to generate an amount of correction for controlling y-axis servomotor 14 based on a deviation between the position command for the y-axis periodically transmitted from higher-level controller 24 and the position feedback (FB) of y-axis servomotor 14 or a driven body, such as a tool, driven by y-axis servomotor 14. The amount of correction and deviation are used as a y-axis servo speed command, via a gain Kp, so as to control y-axis servomotor 14. The position feedback is obtained by a position detecting part 31 configured to detect the y-position of y-axis servomotor 14 or the driven body. Y-axis servo controller 20 has a reference signal generating part 32 configured to generate a reference signal θ which monotonically increases (or varies in one direction) based on the axis command transmitted from higher-level controller 24. Then, learning controller 30 carries out learning control based on the reference signal. The detail of this will be explained below.

In the embodiment, z-axis servo controller 22 is not essential, and the function thereof may be the same as the conventional servo controller. In other words, in order to carry out a predetermined processing, z-axis servo controller 22 is configured to calculate a deviation between the position command for the z-axis periodically transmitted from higher-level controller 24 and the position feedback (FB) of z-axis servomotor 16 or a driven body, such as a tool, driven by z-axis servomotor 16. The deviation is used as a z-axis servo speed command, via a gain Kp, so as to control z-axis servomotor 16. The position feedback is obtained by a position detecting part 33 configured to detect the z-position of z-axis servomotor 16 or the driven body. In FIG. 1, a white circle indicates an adder, and a black circle indicates a branch point. The same is also applicable to FIG. 2 as described below.

Figure 2:
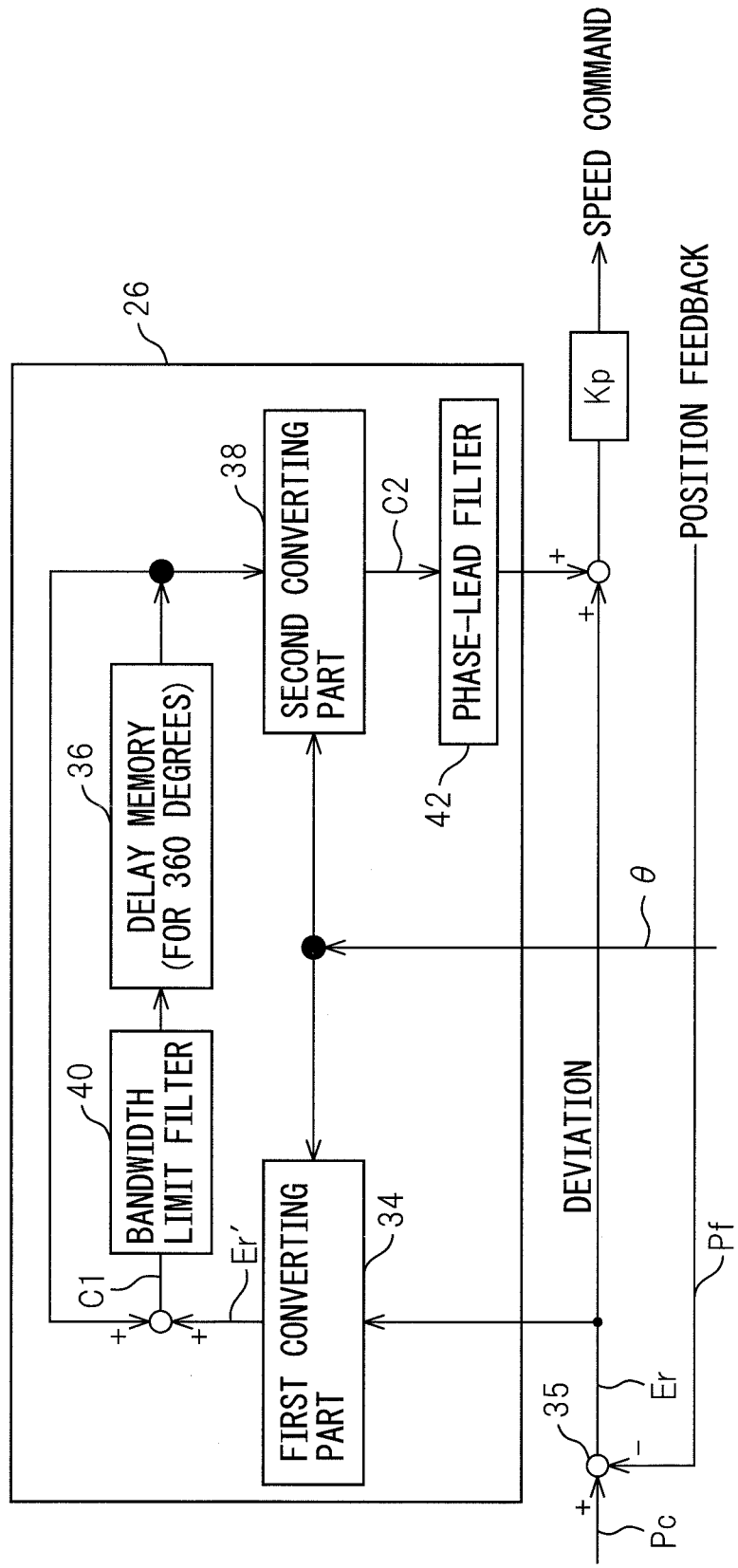
FIG. 2 shows an example of a configuration of an angle-based synchronization learning controller of the servo control system of FIG. 1.

FIG. 2 shows a concrete example of a configuration of learning controller 26 of FIG. 1. In x-axis servo controller 26, a positional deviation Er is calculated at an adder 35 based on position command Pc transmitted from higher-level controller 24 and position feedback Pf. Then, learning controller 26 obtains positional deviation Er of the x-axis servomotor or the driven body, as a first positional deviation, at every sampling period of time (for example, at every 1 ms interval). The first positional deviation is transmitted to a first converting part 34, and then first converting part 34 converts first positional deviation Er to a second positional deviation Er' of an angular reference position in one reciprocating motion of the driven body (as described below). In other words, first positional deviation Er associated with the sampling period of time is converted to second positional deviation Er' associated with the angular reference position. As a calculation technique for the conversion may be known, the detailed explanation thereof is omitted.

After a first correction amount c1 of an immediately previous reciprocating period of the reciprocating motion of the driven body (generally corresponding to 360 degrees), stored in a delay memory 36, is added to second positional deviation Er', and then second positional deviation Er' is stored in delay memory 36 as a renewed or updated first correction amount c1. Renewed first correction amount c1 is transmitted to a second converting part 38, and then second converting part 38 converts first correction amount c1 associated with the angular reference position to a second correction amount c2 associated with the sampling period of time. In other words, the first correction amount associated with the angular reference position is converted to the second correction amount associated with the sampling period of time. As a calculation technique for the conversion may be known, the detailed explanation thereof is omitted.

Learning controller 26 may have a bandwidth limit filter 40 configured to limit a frequency bandwidth of first correction amount c1, and a phase-lead filter 42 configured to compensate a phase and a gain of second correction amount c2 transmitted from second converting part 38. Such filters are not essential to the invention. Concretely, the "bandwidth limit filter" is a low-pass filter for cutting a signal having a relatively high frequency, whereby a control system may be stable. Further, the "phase-lead filter" is a filter for advancing a phase of a signal having a relatively high frequency and increasing a gain of the signal, whereby delay in a control system such as position, speed or current control system, and reduction of the gain in the control system may be compensated. In addition, learning controller 30 of y-axis servo controller 20 may have the same constitution as learning controller 26.

Figure 3:
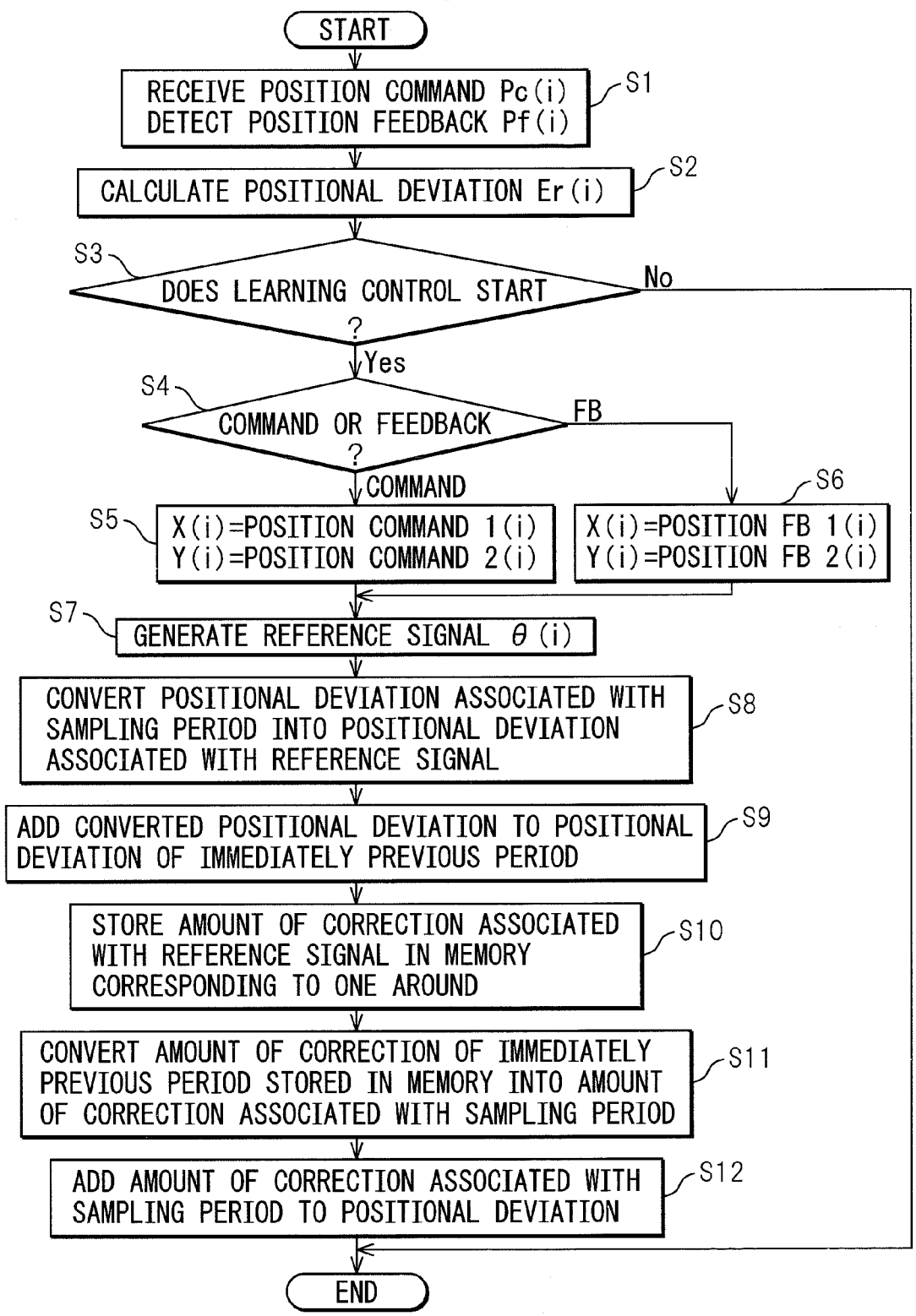
FIG. 3 is a flowchart showing the procedure in the servo control system of the invention.

Hereinafter, the procedure in the servo control system of the invention is explained with reference to flowchart of FIG. 3. First, higher-level controller 24 transmits a position command Pc for each axis to corresponding servo controller, at every predetermined command delivery period of time T (for example, T=1 ms), and each servo controller detects a position feedback Pf (step S1). Next, each servo controller calculates positional deviation Er based on position command Pc and position feedback Pf (step S2). When the learning control should be carried out (step S3), reference signal generating parts 28 and 32 generate reference signal θ based on the position command or the position feedback of the corresponding axis. In this regard, when reference signal θ is generated from position command Pc, the procedure progresses from step S4 to S7 via S5. Otherwise, when reference signal θ is generated from position feedback Pf, the procedure progresses from step S4 to S7 via S6.

The reference signal generating part may generate the reference signal based on the position command or the position feedback of the other axis. For example, reference signal generating part 28 of x-axis servo controller 18 may generate the reference signal based on the position command or the position feedback of the y-axis.

In the next step S8, in first converting part 34 as described above, positional deviation Er associated with the sampling period of time is converted into positional deviation Er' associated with the reference signal (or the angular reference position). Next, positional deviation Er' is added to the positional deviation of immediately previous period, and is stored in delay memory 36 as first correction amount c1 associated with the reference signal (step S10). In this regard, when the shape to be processed is an arc or the like, delay memory 36 stores the correction amount corresponding to one around (360 degrees) of the arc. In the next step S11, in second converting part 38, first correction amount c1 associated with the reference signal corresponding to one around, stored in delay memory 36, is converted into second correction amount c2 associated with the sampling period of time. Then, the second correction amount is added to positional deviation Er so as to generate the speed command (step S12).

Next, the detail of step S7 (i.e., the generation of reference signal θ) is explained. In the machine tool or the industrial machine using the servo control system of the invention, the shape constituted from an arc, a polygon or the combination thereof can be processed. In an example of FIG. 4, the industrial machine having the servo control system processes an arc having a radius R (=1 mm). In this case, x- and y-coordinates of a representative point (for example, a front end of a tool) of the industrial machine are indicated as shown in FIGS. 5a and 5b, respectively. Higher-level controller 24 calculates the command position of each axis (x(t), y(t)) at each command delivery period of time, based on time t (=nT, n=1, 2, 3 . . . ) radius R and a feed speed F (for example, F=376.8 mm/min). (For example, x(t)=R·cos(ωt), y(t)=R·sin(ωt), ωt=Ft/R)

Figure 4:
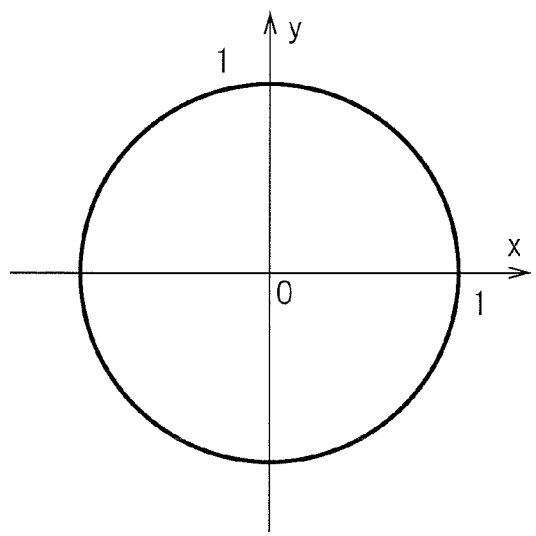
FIG. 4 shows an arc as an example of a shape to be processed.
Figure 5A:
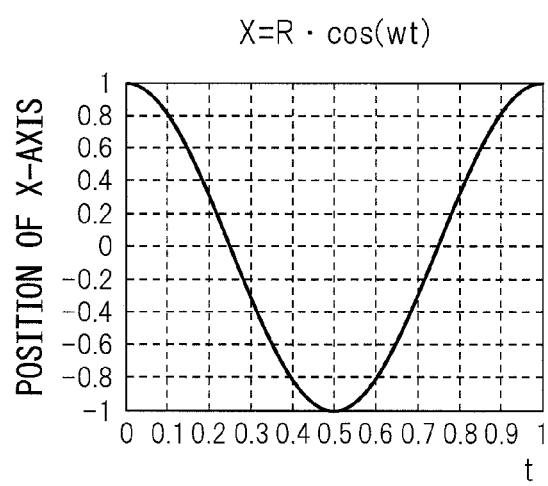
FIGS. 5a and 5b are graphs showing angular positions of x- and y-axes when the processed shape is the arc.
Figure 5B:
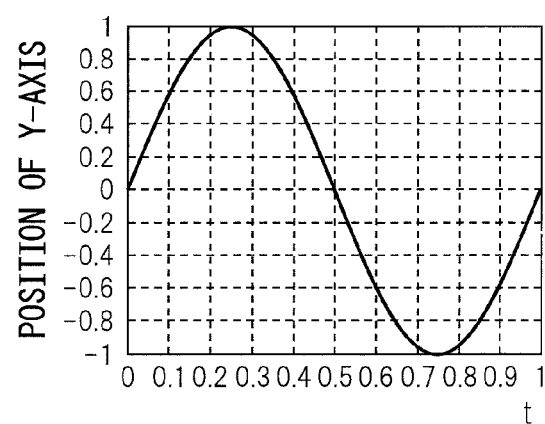

When the arc shape as shown in FIG. 4 is processed, a period of time of the learning control corresponds to one revolution of the arc. The each position command of x- and y-axes represents a sine or cosine curve, which does not monotonically increase or decrease. Therefore, the position command cannot be used as the reference position (or the reference signal) for the angle-based synchronization learning control. In the invention, based on the position command or the position feedback of x- and y-axes, reference signal θ which monotonically increases, corresponding to one revolution of the arc, is generated, which is explained below.

FIGS. 6a and 6b explain a first method for generating the reference signal of the arc processing, i.e., a method for calculating reference angle θ by using a trigonometric function, based on the position command or the position feedback of x- and y-axes. In the arc processing, the positions of x- and y-axes are represented by the sine curve and the cosine curve, respectively, wherein the higher-level controller outputs a command for processing an arc having radius R. Therefore, position posx(t) of the x-axis and position posy(t) of the y-axis, after "t" seconds from the beginning of the processing or the learning control, are represented by the following equations. In the following equations "δ" is a start angle.

$$\text{pos}x(t) = R \cdot \cos(wt+\delta)$$

$$\text{pos}y(t) = R \cdot \sin(wt+\delta)$$

On the other hand, the servo needs (wt+δ) as reference signal θ. Therefore, as shown in FIG. 6a, an arctangent function of a ratio between the positions of the x- and y-axes is used. Concretely, an angular position calculated by the following equation is used as the reference signal.

$$\theta(t) = \tan^{-1}(\text{pos}y(t)/\text{pos}x(t))$$

Next, in order that reference signal θ monotonically increases, quadrants are defined depending on a sign (plus or minus) of x- and y-coordinates. Concretely, θ(t)=tan$^{-1}$(posy(t)/posx(t)) where x>0 and y>0;
θ(t)=tan$^{-1}$(posy(t)/posx(t))+180° where (x<0 and y>0) or (x<0 and y<0); and
θ(t)=tan$^{-1}$(posy(t)/posx(t))+360° where x>0 and y<0.

Due to the above, monotonically increasing reference signal θ is obtained, as shown in FIG. 6b.

Figure 7A:
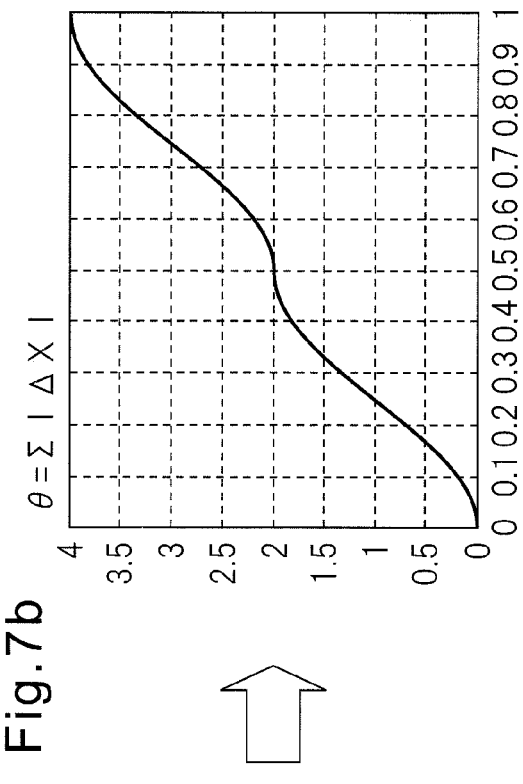
FIGS. 7a to 7d show a second generating method of a reference signal when the arc shape is processed.
Figure 7B:
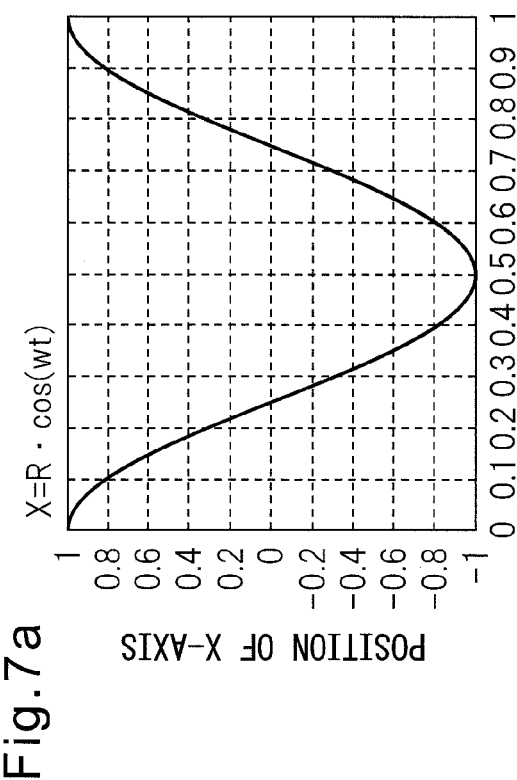
Figure 7C:
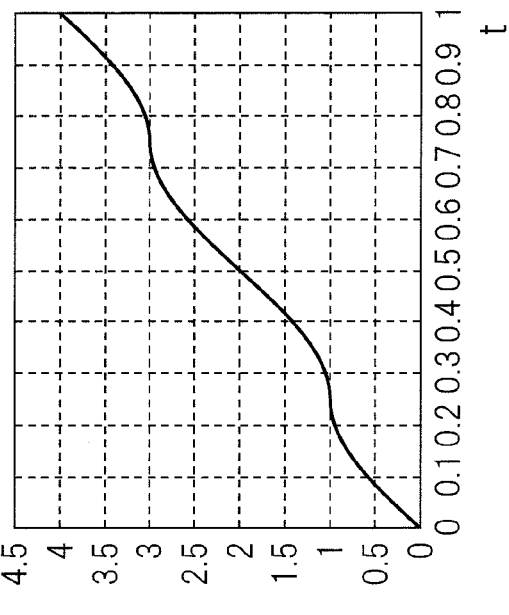
Figure 7D:
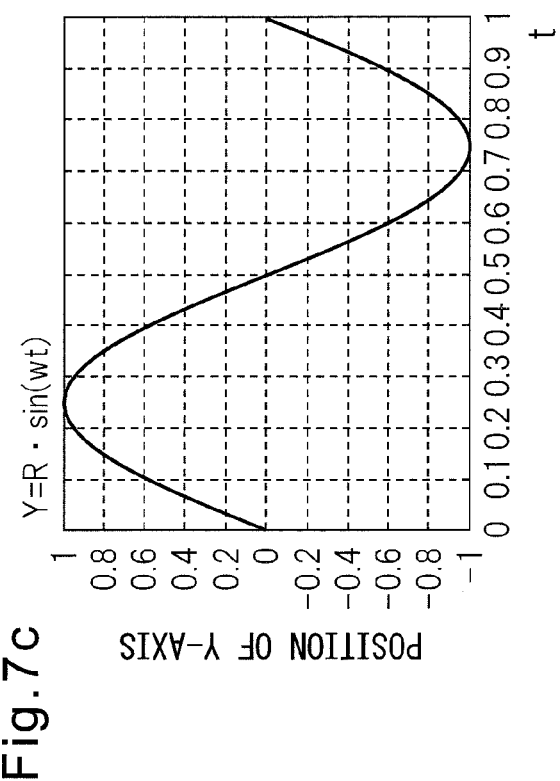

FIGS. 7a to 7d explain a second method for generating the reference signal when the arc shape is processed, i.e., a method using the position command or the position feedback of the cooperative other axis (e.g., using the data of the y-axis for generating the reference signal for the x-axis, and using the data of the x-axis for generating the reference signal for the y-axis). Concretely, FIG. 7a shows the position of the x-axis, and FIG. 7b shows a value ($\Sigma|\Delta x|$) obtained by integrating an absolute value of difference $\Delta x$ of the position of FIG. 7a between each sampling period. The value as shown in FIG. 7b is used as reference signal θy for the y-axis. Similarly, FIG. 7c shows the position of the y-axis, and FIG. 7d shows a value ($\Sigma|\Delta y|$) obtained by integrating an absolute value of difference $\Delta y$ of the position of FIG. 7c between each sampling period. The value as shown in FIG. 7d is used as reference signal θx for the x-axis. In this way, by using the integrated value of the absolute value of the amount of movement (or the difference) of the other axis, as the reference signal, the monotonically increasing reference signal may be generated with very low amount of calculation, in comparison to the first method for generating the reference signal as described above. Further, it is advantageous to use the command position of the other axis, since an amount of change at the time of inversion of the servo, which requires a high accuracy, may be increased.

Figure 8:
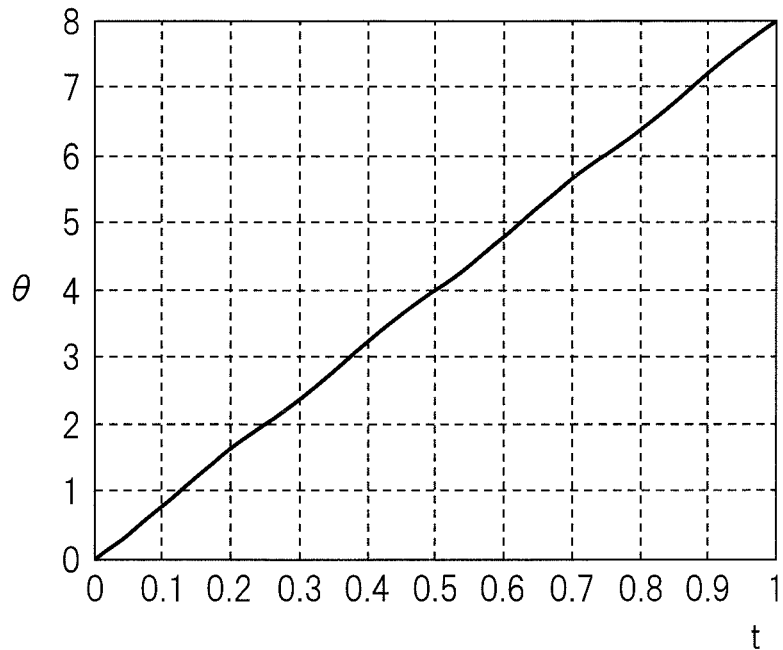
FIG. 8 shows a third generating method of a reference signal when the arc shape is processed.
Figure 9:
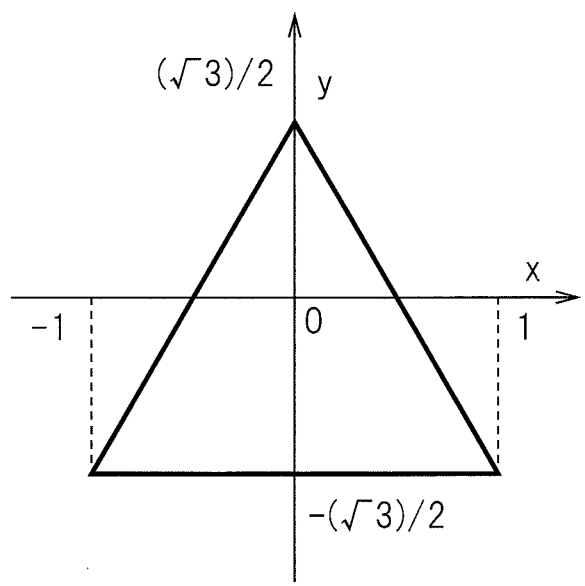
FIG. 9 shows a triangle as an example of a shape to be processed.
Figure 10:
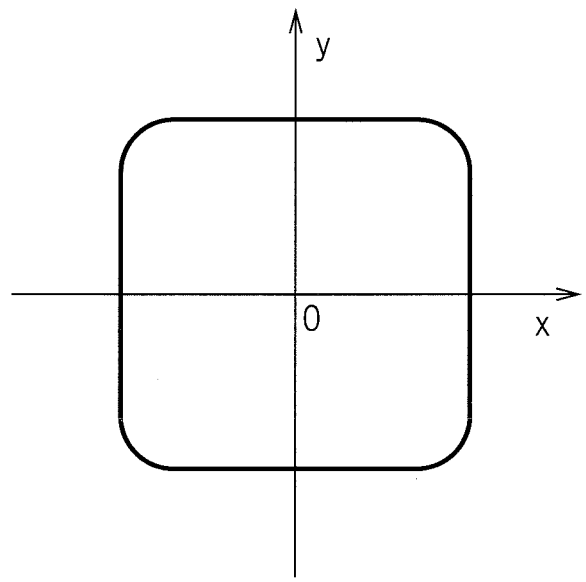
FIG. 10 shows a quadrangle with rounded corners as an example of a shape to be processed.

FIG. 8 explains a third method for generating the reference signal when the arc shape is processed, i.e., a method using the position command or the position feedback of the cooperative other axis (e.g., using the data of the y-axis for generating the reference signal for the x-axis, and using the data of the x-axis for generating the reference signal for the y-axis). Concretely, as shown in FIG. 8, reference signal θ ($=\Sigma|\Delta x|+\Sigma|\Delta y|$) is obtained by adding the integrated value ($\Sigma|\Delta x|$) obtained by integrating the absolute value of difference $\Delta x$ of the position between each sampling period (for example, FIG. 7b), to the integrated value ($\Sigma|\Delta y|$) obtained by integrating the absolute value of difference $\Delta y$ of the position between each sampling period (for example, FIG. 7d). When the shape to be processed is an interpolation shape between the x- and y-axes, by using the summation of the integrated values of the absolute values of the movement commands of the x- and y-axes, the monotonically and generally linearly increasing (and thus useful) reference signal may be obtained.

Figure 11:
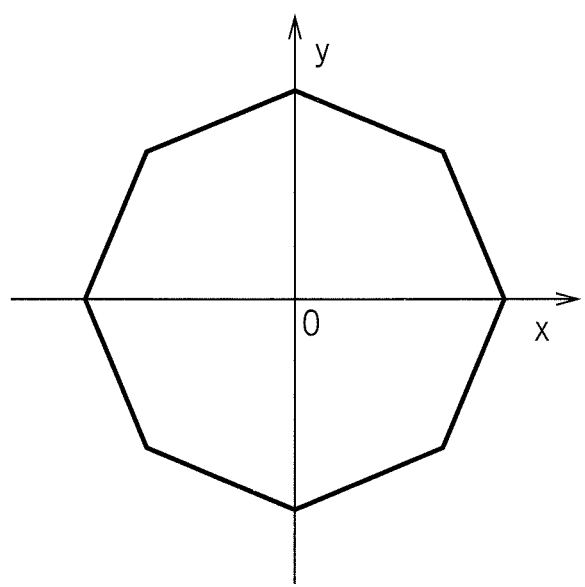
FIG. 11 shows an octagon as an example of a shape to be processed.
Figure 14:
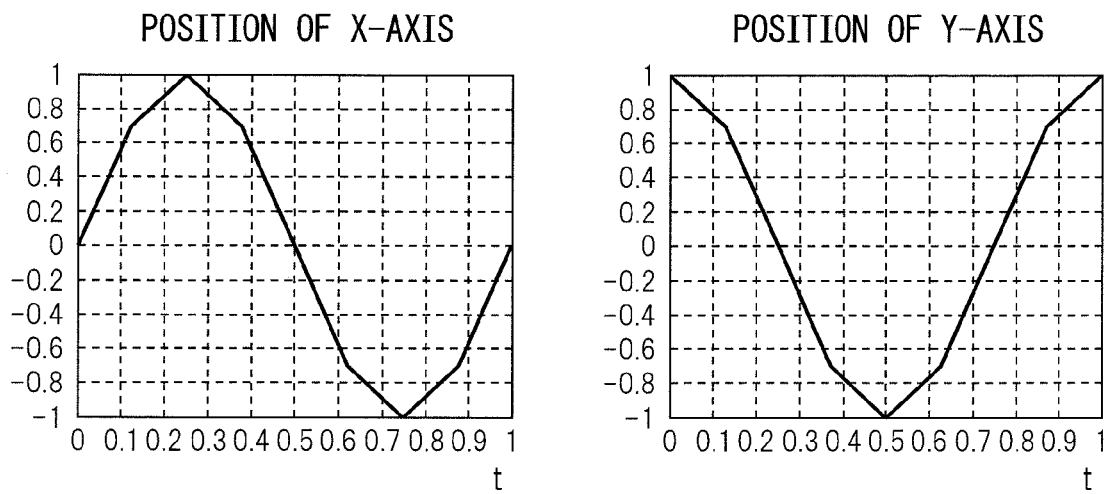
FIG. 14 shows graphs showing angular positions of x- and y-axes when the processed shape is the octagon.
Figure 15:
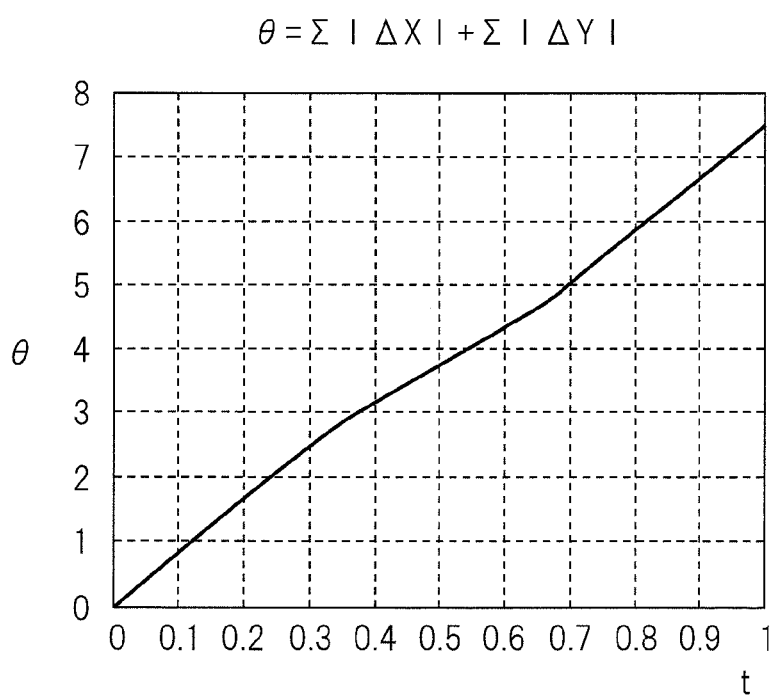
FIG. 15 is a graph explaining the procedure for generating a reference signal which monotonically increases when the processed shape is the triangle.
Figure 16:
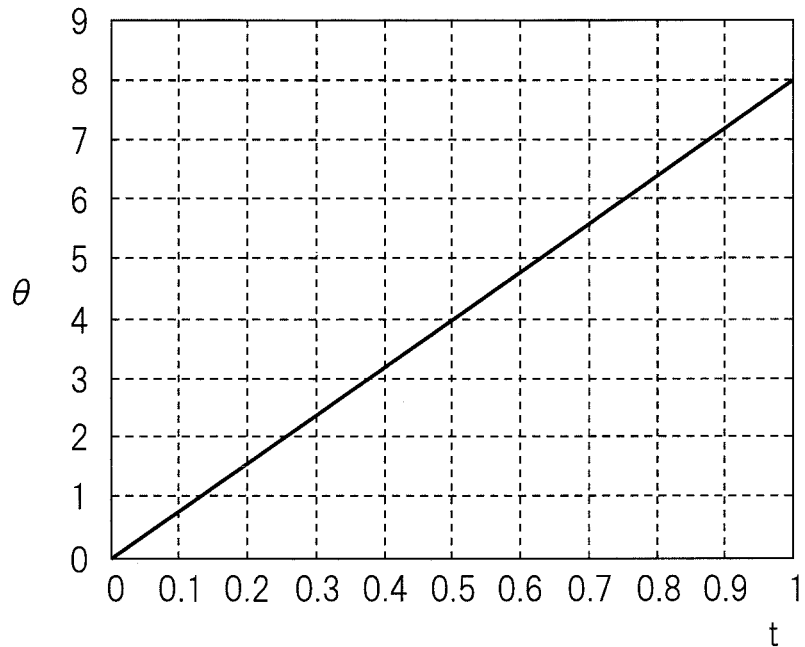
FIG. 16 is a graph explaining the procedure for generating a reference signal which monotonically increases when the processed shape is the quadrangle with rounded corners.
Figure 17:
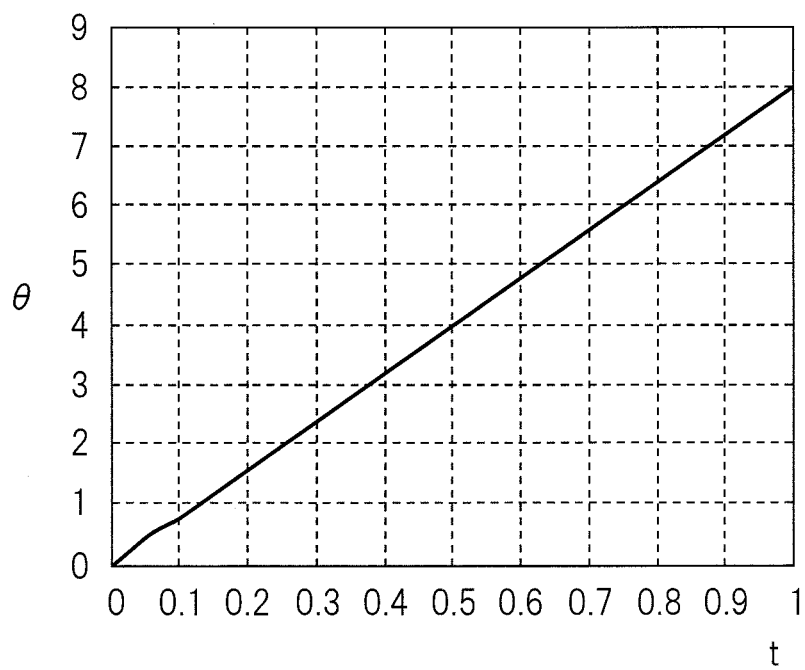
FIG. 17 is a graph explaining the procedure for generating a reference signal which monotonically increases when the processed shape is the octagon.

The reference signal generated by the third generating method generally represents a contour length of the shape to be processed. Therefore, the reference signal generated by the third generating method may also be used when the shape to be processed is a polygon or the combination of the arc and the polygon, etc. For example, when the shape to be processed is a triangle (FIG. 11), a quadrangle with rounded corners (FIG. 12), or an octagon (FIG. 13), the position commands of the x- and y-axes are generated as shown in FIGS. 12 to 14, respectively. When the third generating method is applied to each of the shapes of FIGS. 12 to 14, reference signal θ for the triangle is generated as shown in FIG. 15, reference signal θ for the quadrangle with rounded corner is generated as shown in FIG. 16, and reference signal θ for the octagon is generated as shown in FIG. 17. As shown in FIGS. 15 to 17, each reference signal θ monotonically and generally linearly increases.

Figure 18:
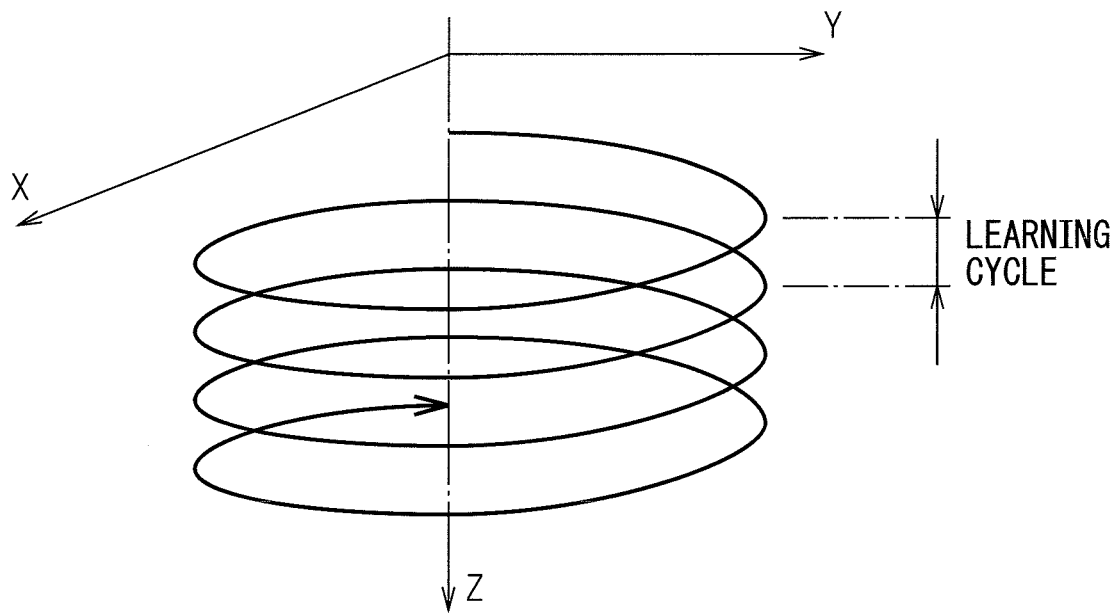
FIG. 18 shows a helical processing as an example of a processing.
Figure 19:
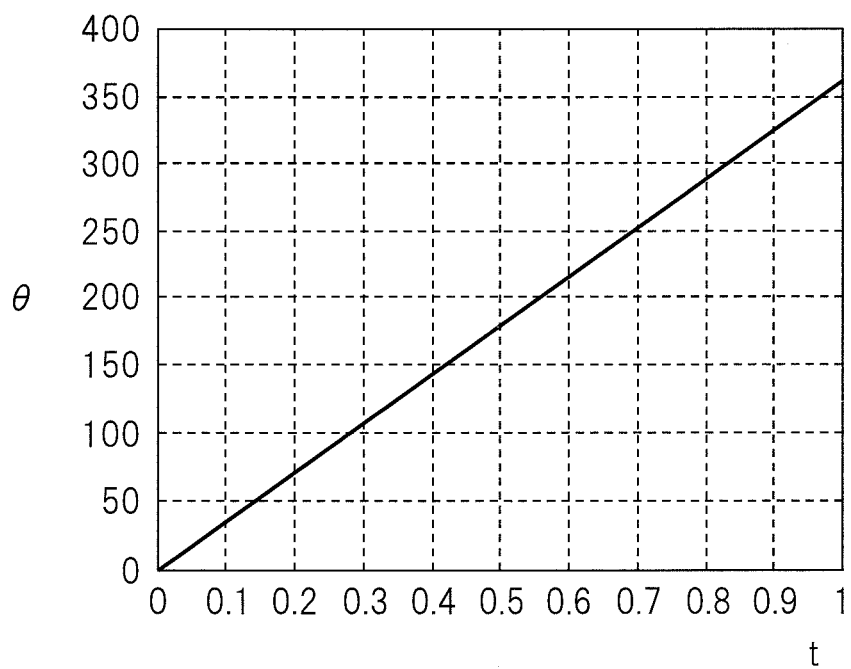
FIG. 19 is a graph explaining the procedure for generating a reference signal which monotonically increases when carrying out the helical processing.

FIG. 18 explains a helical processing, e.g., a feed operation is added to the arc processing of FIG. 4. In this case, a period of time, corresponding to an amount of feed of the z-axis during one revolution of the arc, may be determined as a cycle of the learning control. Reference signal θ in this case corresponds to the position command or the position feedback of the z-axis (i.e., θ=z), as shown in FIG. 19. When the shape to be processed is a helical interpolation, the position of the z-axis (or the helical axis) typically moves at a constant speed. Therefore, the monotonically and linearly increasing (and thus useful) reference signal may be obtained by substantially no calculation.

As described above, the invention provides the servo control system capable of using the angle-based synchronization learning control, while maintaining the advantage of the angle-based synchronization, even when the reference signal is not given. Although Japanese Unexamined Patent Publication (Kokai) No. 2004-280772 discloses the angle-based synchronization learning control, such learning control is applied to a lathe capable of processing a workpiece by combining a rotation axis and a linear axis, and the position command or position feedback for the rotation axis is necessary, wherein the reference signal of the position command or position feedback is required to monotonically increase. However, when a workpiece is processed by using mutually orthogonal axes (or x- and y-axes) (for example, in a conventional machining center), the position command of each axis does not monotonically increase, and thus the position command cannot be used as the reference signal. Even in such a case, due to the invention, the appropriate reference signal can be obtained by simple calculation, whereby the angle-based synchronization learning control may be used.

According to the servo control system of the present invention, the angle-based synchronization learning control may be used by calculating the reference signal which varies in one direction, based on the position command or position feedback.

When the arc shape is processed, the reference signal may be calculated based on the position commands of x- and y-axes. Such reference signal is useful, since the reference signal linearly and monotonically increases.

By using the integrated value of the absolute values of the amount of movement of the other axis as the reference signal, the monotonically increasing reference signal may be generated with low amount of calculation. Further, it is advantageous to use the command position of the other axis, since the amount of change at the time of inversion of the servo, which requires a high accuracy, may be increased.

By using the summation of the integrated values of the absolute values of the movement commands of the x- and y-axes, the monotonically and generally linearly increasing (and thus useful) reference signal may be obtained. Further, the reference signal generally represents a contour length of the shape to be processed, and thus the reference signal generated may also be used when the shape to be processed is a polygon or the combination of the arc and the polygon, etc.

When the position command of the position of the helical axis, which moves at a constant speed, is used, the monotonically and linearly increasing (and thus useful) reference signal may be obtained by substantially no calculation.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A servo control system of an industrial machine or a machine tool for processing a processed shape constituted by an arc, a polygon or a combination thereof, by means of cooperative operation of a plurality of axes including two mutually orthogonal axes, the servo control system comprising:

a higher-level controller configured to transmit position commands for processing the processed shape to a servomotor of each of the plurality of axes; and a plurality of servo controllers, each configured to drive the servomotor of each axis based on the position command so as to move a driven body, the servo controllers for at least the two mutually orthogonal axes comprising:

a position detecting part configured to detect the position of the servomotor or the driven body;

a positional deviation calculating part configured to calculate a deviation between the position command and a detected position feedback of the servomotor, at every predetermined sampling period of time;

a reference signal generating part configured to generate a reference signal which monotonically increases, based on the position command or the position feedback of the own axis or another axis; and a learning controlling part configured to carry out angle-based synchronization learning control based on the reference signal, the position command and the positional deviation.

2. The servo control system as set forth in claim 1, wherein the reference signal generating part generates an angular position as the reference signal, based on the position command or the position feedback of x- and y-axes, the origin of which is the center of an arc, the angular position being calculated by an arctangent function of a ratio between positions of the x- and y-axes.

3. The servo control system as set forth in claim 1, wherein the reference signal generating part generates the reference signal, based on the position command or the position feedback of the another axis, by integrating each absolute value of an amount of movement of the another axis at every predetermined sampling period of time.

4. The servo control system as set forth in claim 1, wherein the reference signal generating part generates the reference signal, when the processed shape is an interpolation shape between x- and y-axes, the reference signal being obtained by calculating a summation of an integrated value of each absolute value of an amount of movement of the position command or the position feedback of x-axis at every predetermined sampling period of time, and an integrated value of each absolute value of an amount of movement of the position command or the position feedback of y-axis at every predetermined sampling period of time.

5. The servo control system as set forth in claim 1, wherein the reference signal generating part generates the reference signal, when the processed shape is a helical interpolation shape, the reference signal corresponding to the position command or the position feedback of a helical axis.

6. The servo control system as set forth in claim 1, wherein the reference signal generating part generates the reference signal based on the position command or the position feedback of the another axis.

* * * * *